US012159230B2

United States Patent
Sun et al.

(10) Patent No.: US 12,159,230 B2
(45) Date of Patent: Dec. 3, 2024

(54) DEEP LEARNING MODEL FOR CLOUD BASED TECHNICAL SUPPORT AUTOMATION

(71) Applicant: Oracle International Corporation, Redwood Shores, CA (US)

(72) Inventors: Wenchao Sun, Saratoga, CA (US); Zhengrong Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 914 days.

(21) Appl. No.: 16/057,035

(22) Filed: Aug. 7, 2018

(65) Prior Publication Data
US 2020/0050942 A1  Feb. 13, 2020

(51) Int. Cl.
*G06N 3/084* (2023.01)
*G06F 3/0484* (2022.01)
(Continued)

(52) U.S. Cl.
CPC .......... *G06N 3/084* (2013.01); *G06F 16/951* (2019.01); *G06F 40/58* (2020.01); *G06N 3/006* (2013.01);
(Continued)

(58) Field of Classification Search
CPC ...... G06N 3/084; G06N 3/006; G06N 3/0445; G06N 3/0454; G06F 3/0484; G06F 16/951; G06F 40/58
See application file for complete search history.

(56) References Cited

U.S. PATENT DOCUMENTS

| 6,694,314 B1 | 2/2004 | Sullivan et al. |
| 6,973,620 B2 | 12/2005 | Gusler et al. |
| 9,008,283 B2 | 4/2015 | Riahi et al. |
| 9,785,715 B1 | 10/2017 | Busey et al. |

(Continued)

FOREIGN PATENT DOCUMENTS

| CN | 107025283 | 8/2017 |
| WO | WO2017112496 | 6/2017 |

OTHER PUBLICATIONS

Cui, Lei, et al. "Superagent: A customer service chatbot for e-commerce websites." Proceedings of ACL 2017, system demonstrations. (Year: 2017).*

(Continued)

*Primary Examiner* — Michael J Huntley
*Assistant Examiner* — Adam C Standke
(74) *Attorney, Agent, or Firm* — Trellis IP Law Group, PC

(57) ABSTRACT

An example system and method facilitate enabling precise answers to technical support questions pertaining to a given computing environment, e.g., a cloud-based enterprise computing environment. The example method includes using an overtrained recurrent neural network employing Long Short-Term Memory (LSTM) cells to selectively answer specific questions by providing precise answers to technical support questions. A second neural network that is not overtrained can provide more generalized answers when a confidence measurement of an answer of the first neural network falls below a predetermined threshold. Furthermore, expert staff, e.g., developers and/or engineers that may be able to more precisely answer a specific question may be shown the answer. Subsequent expert answers or modifications to existing answers may be used to further refine the neural networks, e.g., via periodic supervised learning.

20 Claims, 9 Drawing Sheets

(51) Int. Cl.
  *G06F 16/951* (2019.01)
  *G06F 40/58* (2020.01)
  *G06N 3/006* (2023.01)
  *G06N 3/044* (2023.01)
  *G06N 3/045* (2023.01)

(52) U.S. Cl.
  CPC ............ *G06N 3/044* (2023.01); *G06N 3/045* (2023.01); *G06F 3/0484* (2013.01)

(56) References Cited

U.S. PATENT DOCUMENTS

| | | | |
|---|---|---|---|
| 9,852,177 B1 | 12/2017 | Cheung et al. | |
| 2009/0245500 A1 | 10/2009 | Wampler | |
| 2014/0279050 A1 | 9/2014 | Makar et al. | |
| 2017/0180284 A1 | 6/2017 | Smullen et al. | |
| 2018/0012121 A1 | 1/2018 | Liu et al. | |
| 2018/0131645 A1* | 5/2018 | Magliozzi | H04L 51/02 |
| 2019/0068526 A1* | 2/2019 | Xie | H04L 67/303 |
| 2020/0007380 A1* | 1/2020 | Chen | H04L 51/02 |

OTHER PUBLICATIONS

Qiu, Minghui, et al. "Ali me chat: A sequence to sequence and rerank based chatbot engine." Proceedings of the 55th Annual Meeting of the Association for Computational Linguistics (vol. 2: Short Papers) (Year: 2017).*
Dhoolia et al. "A cognitive system for business and technical support: A case study." IBM Journal of Research and Development 61.1 (Year: 2017).*
Le et al. "Lstm-based mixture-of-experts for knowledge-aware dialogues." arXiv preprint arXiv: 1605.01652 (Year: 2016).*
https://deeplearning4j.org/lstm.html#recurrent—21 pages.
https://en.wikipedia.org/wiki/Overfitting#Machine_learning—7 pages.
Is artificial intelligence the future of tech support https://www.teksystems.com/en/resources/teksavvy-blog/2018/ai-tech-support-chatbot.
Learning System Customer Service Chatbot https://smartech.gatech.edu/bitstream/handle/1853/59561/robert_schmidt_paper.pdf?sequence=1&isAllowed=y Robert W. Schmidt.

* cited by examiner

DEEP LEARNING MODEL FOR CLOUD BASED TECHNICAL SUPPORT AUTOMATION

BACKGROUND

Present application relates to software and more specifically to software and accompanying methods for using Artificial Intelligence (AI) to process and answer queries and/or respond to statements, such as technical questions and statements related to cloud-based enterprise computing environments.

Artificial Intelligence (AI) systems and methods are employed in various demanding applications, including chatbots for implementing enterprise technical support; language translation, natural language processing, image recognition, and so on. Such applications often demand efficient time-saving algorithms that can readily provide accurate answers or replies in response to questions or statements around the clock.

AI systems that can quickly provide accurate answers to particular questions can be particularly important for implementation of technical-support chatbots, e.g., for answering technical questions pertaining to complex cloud-based enterprise computing environments. In such environments, accurate AI systems that can facilitate high-quality cost-effective 24/7 customer support can enhance customer satisfaction and revenue of cloud-service providers.

Technical support personnel, e.g., technicians, may provide technical support to customers, contractors, data-center installation staff, etc., via phone calls, email exchanges, and so on. Technicians may rely upon their own knowledge in combination with use of knowledge-based systems, e.g., databases, trouble-shooting software, and so on, to help answer technical questions.

However, in complex cloud-based computing environments, individual technicians often lack expertise in all applicable technical areas. Furthermore, a particular technician or expert team that may have sufficiently deep knowledge to answer a particularly difficult customer question may not be known by the technician fielding the original query.

Furthermore, the technicians may also lack requisite skill and/or knowledge to efficiently use available knowledge-based systems. In addition, the available knowledge-based systems may lack sufficient functionality to enable technicians to quickly provide accurate answers to customer questions. Furthermore, the most skilled technicians for answering particular questions may not be available 24/7. This can create excessive delays, especially when customers are in different time zones.

Accordingly, AI-based customer support chatbots are becoming increasingly prevalent. However, such systems tend to provide relatively generic responses to customer queries, which often do not solve or precisely answer customer questions.

SUMMARY

An example method facilitates answering technical questions pertaining to a computing environment, such as cloud-based enterprise computing environments, using, in part, a deep learning Artificial Intelligence (AI) module that has been strategically overtrained, contrary to what is widely taught in the art, to provide very specific answers to questions applicable to the associated cloud-based computing environment. The method can further involve use of a compound chatbot that selectively employs different AI modules, one module that is overtrained, and another that is not overtrained, to selectively answer questions or respond to statements.

The example method includes receiving an input query pertaining to the computing environment; determining if the input query can be answered with a predetermined degree of confidence by a first neural network, and providing a first signal in response thereto; using the first neural network to generate a first answer to the query when the input query can be answered with the predetermined degree of confidence, as indicated by the first signal; and employing a second neural network to provide a second answer to the query when the query cannot be answered by the first neural network with the predetermined degree of confidence, as indicated by the first signal.

In a more specific embodiment, the first neural network includes an overtrained neural network (also called an overfit or curve fit neural network), which may be trained with question and answer pairs obtained from a record of conversations between technicians, support personnel, customers, etc. (e.g., question askers) and developers or engineers (i.e., experts). The second neural network includes a non-overtrained neural network, which may be trained with more generalized data, including data obtained from searches of data (e.g., cloud, Internet, and web document searches) pertaining to various technology domains applicable to the cloud-based computing environment for which the method is used.

The first neural network and the second neural network may include or represent deep learning recurrent neural networks with Long Short-Term Memory (LSTM) cells and/or other types of cells with (or with access to) suitable memory to overcome a gradient-vanishing problem that may characterize other neural networks and associated AI modules and chatbots. In the specific example embodiment, the first neural network and the second neural network are part of a compound chatbot. The first neural network and the second neural network may be implemented via modified versions of language-translation neural networks.

The computing environment may include an enterprise computing environment, and the query may represent a technical support question provided to the chatbot by technical support personnel. The specific example method further includes determining a developer team (e.g., engineering team or other team of experts) associated with the first answer; and informing the developer team (or member thereof) when the input query cannot be answered by the first neural network with the predetermined degree of confidence. The step of informing may include automatically sending an electronic message to the developer team, which may then provide another answer, e.g., a third answer.

The specific example method may further include displaying the first answer, second answer, and/or third answer in a first portion of User Interface (UI) display screen, in combination with results of a search engine. The search engine may be implemented via an index-based search engine with abilities to search existing knowledge documents and the Internet using keyword scoring.

Hence, various embodiments discussed herein may overcome deficits and inefficiencies in approaches to answering technical support questions that excessively rely upon technical support staff knowledge, skill, and availability for timely and efficient delivery of precise and accurate answers and associated solutions to technical questions or problem statements pertaining to a given computing environment. The problems are overcome, in part, by using a strategically overtrained neural network that provides specific answers to questions confined by a problem domain of the associated computing environment.

Such a method can be particularly useful for businesses offering Software as a Service (SaaS) and Infrastructure as a Service (IaaS) services, where timely installation, implementation, and servicing of software and infrastructure can be critical to profits.

A further understanding of the nature and the advantages of particular embodiments disclosed herein may be realized by reference of the remaining portions of the specification and the attached drawings.

DETAILED DESCRIPTION OF EMBODIMENTS

Figure 1:
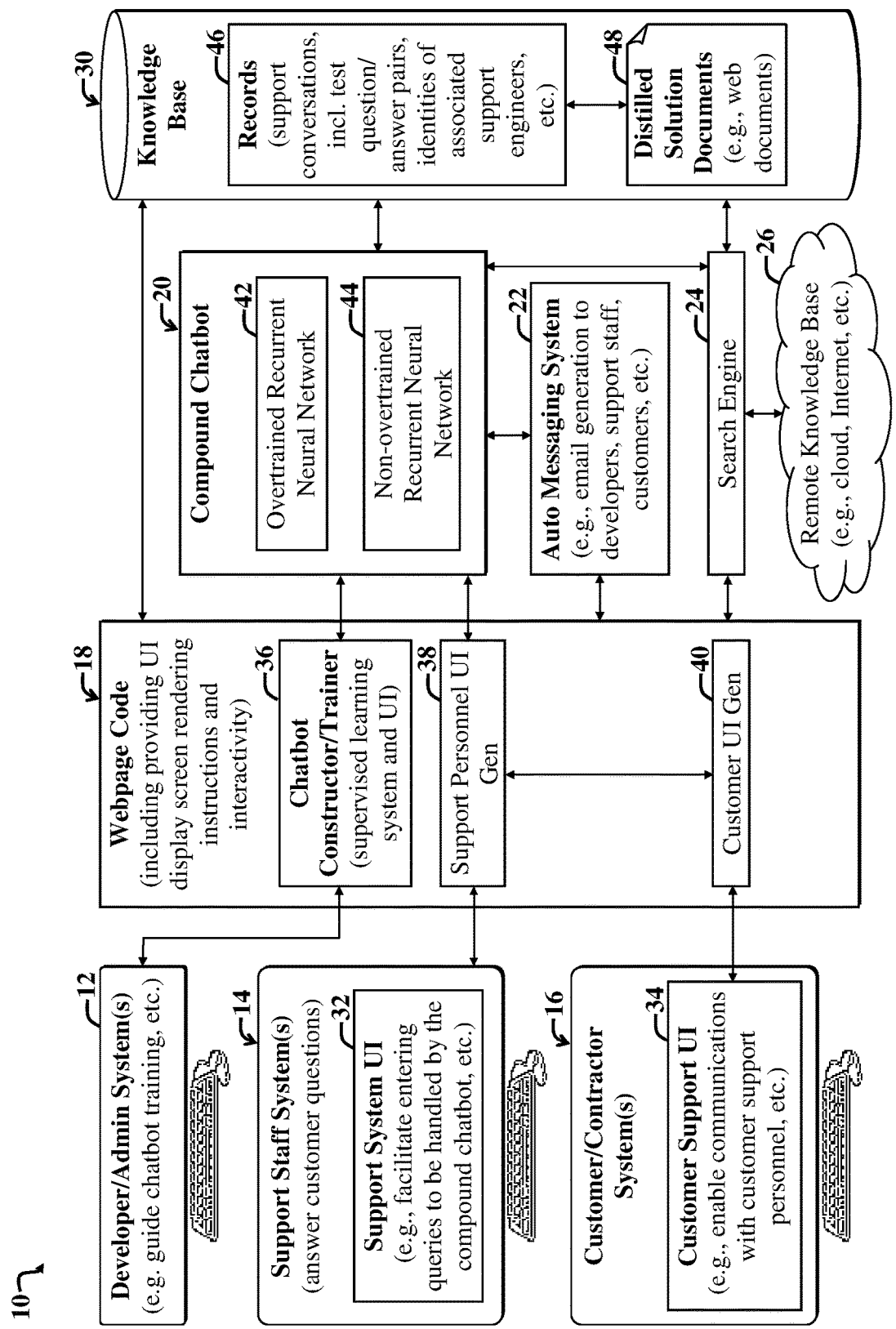
FIG. 1 is a first block diagram illustrating a first example system and accompanying computing environment that includes a compound chatbot with an overtrained neural network and a non-overtrained neural network used to facilitate answering technical support questions pertaining to the computing environment.

For the purposes of the present discussion, a computing environment may be any collection of computing resources used to perform one or more tasks involving computer processing. A computer may be any processor in communication with a memory. Generally, computing resource may be any component, mechanism, or capability or quantities thereof of a computing environment, including, but not limited to, processors, memories, software applications, user input devices, and output devices, servers, processes, and so on.

An enterprise computing environment may be any computing environment used for an enterprise. An enterprise may be any organization of persons, such as a business, university, government, military, and so on. The terms "organization" and "enterprise" are employed interchangeably herein.

An example enterprise computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) domain.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices, such as the smart device behavior analysis and control system 128, via the Internet.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Generally, embodiments discussed more fully below address providing answers to specific problem statements or questions, e.g., as may relate to a technical support domain for a cloud-based enterprise computing environments. In such domains, precise correct answers, as opposed to merely close answers, can be important for enabling quick and efficient resolution of problems.

Cloud-based technical support organizations and systems may require technical support personnel to answer questions from customers, contractors, software and infrastructure installers, and so on. The quality of the technical support provided can depend upon support personnel technical knowledge and skill at using available knowledge-based systems. Accordingly, providing round-the-clock effective high quality technical can be difficult, in absence of the use of various embodiments discussed more fully below.

For clarity, certain well-known components, such as hard drives, processors, operating systems, power supplies, Internet Service Providers (ISPs), Natural Language Processors (NLPs), enterprise clouds, Java Virtual Machines (JVMs), and so on, are not necessarily explicitly called out in the figures. However, those skilled in the art with access to the present teachings will know which components to implement and how to implement them to meet the needs of a given implementation.

FIG. 1 is a first block diagram illustrating a first example system 10 and accompanying computing environment that includes a compound chatbot 20 with an overtrained neural network 42 and a non-overtrained neural network 44 used to facilitate answering technical support questions pertaining to the computing environment. The computing environment 10 may represent or be a part of a cloud-based enterprise computing environment.

The example system 10 includes one or more developer systems 12 in communication with webpage code 18, including a chatbot constructor/trainer 36 (also simply called a chatbot trainer or chatbot constructor herein). The webpage code 18 may be hosted on a web server and may be accessible via a web browser.

Note that while for illustrative purposes, three actors (using the developer system 12, the support staff system 14, and customer system 16) use the system 10, that in practice, only two actors are needed to train the neural networks 42, 44—one actor that provides questions or problem statements, and another that provides accurate answers to the questions or problem statements.

For the purposes of the present discussion, a chatbot may be any software system or program with functionality for interacting with users via natural language (e.g., spoken or written text), such as by receiving natural language as input and/or providing natural language as output. A compound chatbot may be any chatbot that includes two or more different chatbots or otherwise simulates two or more different entities interacting with a user of the compound chatbot.

In the present example embodiment, the compound chatbot 20 includes a first overtrained neural network 42 that is part of a first chatbot, and a second non-overtrained neural network 44 that is part of a second chatbot, as discussed more fully below, e.g., with reference to FIG. 4.

One or more support staff systems 14 (also called technician systems herein) also communicates with the webpage code 18, including a support personnel (e.g., technician) User Interface (UI) generator 38 for generating rendering instructions for one or more support system UI display screens 32 displayed via the one or more support staff systems 14.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

One or more customer systems 16 also communicate with the webpage code 18, including a customer UI generator 40 thereof for generating rendering instructions for one or more customer support UI display screens 34. The customer support UI display screens 34 may provide UI controls for facilitating communications with support staff (e.g., technicians) manning the support staff systems 14.

Note that in certain embodiments, the customer systems 16 may represent or be replaced systems of contractors hired by proprietors of the system 10 and accompanying computing environment. The support staff systems 14 may represent systems used by technicians. The technicians may be tasked, for example, with answering technical questions posed by the contractors associated with or used by the customer systems 16. The developer systems 12 may also include or represent systems of engineers, experts, system administrators, and/or others, e.g., engineering teams, with sufficient technical knowledge to precisely and accurately answer technical questions that support staff or technicians of the systems 14 may be unable to answer.

In the present example embodiment, a user of the customer or contractor system 16 may pose questions to support staff, e.g., to a support technician operating the support staff system 14. Questions may be posed to the support staff via a webpage implemented via the webpage code 18. Communications between the customer or contractor system 16 and the support staff system 14 are effectuated via respective UIs 34, 32 implemented via respective server-side UI generators 40, 38.

Similarly, when a technician operating the support staff system 14 cannot precisely answer a question (e.g., a particular question posed by a customer or contractor using the customer system 16) then developers or engineers (i.e., specialized experts) may be contacted to provide precise answers and/or solutions to stated problems or posed questions (also called queries herein).

Conversations between technicians of the support staff systems 14 and developers/engineers of the developer systems 12, and resultant solutions, i.e., answers are stored in a knowledge base 30 as records 46 and distilled solution documents 48. The conversation records 46 and distilled solution documents 48 are then usable by a chatbot constructor (also called chatbot trainer) 36 of the webpage code 18 to train a compound chatbot 20, as discussed more fully below.

Generally, the webpage code 18 may represent server-side software functionality running on a web server and provided by one or more web pages associated with the computing environment 10. For the purposes of the present discussion, software functionality may be any function, capability, or feature, e.g., stored or arranged data, that is provided via computer code, i.e., software. Generally, software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, training neural networks, sending email messages, and so on. Generally, a software action may be any process or collection of processes or operations implemented via software. Additional examples of processes include updating or editing data in a database, triggering a sequence of processes, implementing a database backup operation, and so on.

In the present example embodiment, the compound chatbot 20 communicates with the chatbot trainer 36, the support personnel UI code 38, an automatic messaging system, a search engine 24, and the knowledge base 30. The search engine 24 also communicates with the webpage code 18, the knowledge base 30, and sources of additional searchable content 26 (also called remote knowledge base herein), e.g., general cloud documentation, the Internet, and so on.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, in certain implementations, the search engine 24 may be incorporated into the compound chatbot 20, and the chatbot trainer 36, support personal UI code 38 and customer UI code 40 may be hosted on different websites, and so on.

In an example scenario, before the compound chatbot 20 is activated for use by the support personnel UI code 38, the knowledge base 30 is populated with conversation records 46 and associated distilled solution documents 48. The conversation records 46 are organized into (or otherwise marked with metadata indicating) question and answer pairs, which are then used by the chatbot trainer 36 to selectively train the neural networks 42, 44. Interactions between users (e.g., technicians) of the support staff systems 14 and users (e.g., expert developers and/or engineers) of the developer systems 12 can be logged in problem tickets, documenting a particular question/problem and the sequence of communications involved with solving the problem. Documentation pertaining to the final resolution of the problem or question may be stored among distilled solution documents 48, also called web documents herein.

Generally, logged communication exchanges (corresponding to comments in the problem tickets) are usable as conversation building blocks for training the compound chatbot 20. In the present example embodiment, comments from support teams (e.g., teams using the support staff systems 14) are treated as questions or problem statements, and corresponding responsive comments from development teams (e.g., using the developer systems 12) are treated as the answers to the questions or problem statements. Content from the distilled solution documents linked to a particular conversation can also be used as answers for the purposes of selectively training the neural networks 42 for use in the compound chatbot 20. Data from the conversation records and distilled solution documents 48 is called the training set, i.e., the dataset used to train the compound chatbot 20.

In the present example embodiment, the compound chatbot 20 further includes functionality for using the conversation records 46 and distilled solution documents 48 to identify particular experts (e.g., developers, engineers, etc.) and/or teams of experts that have provided a solution or answer to a particular problem statement or question. For the purposes of the present discussion, a problem statement may be considered a type of question or query, and a question may be considered a type of problem statement. Generally, a question may be any input that seeks a response, i.e., answer.

The compound chatbot 20 also includes functionality for selectively triggering automatic messaging of an identified expert developer via the automatic messaging system 22. For example, an expert team of developers may be automatically notified of a particular problem or question that the compound chatbot 20 cannot answer with a predetermined confidence or accuracy. Each answer output by the first overtrained neural network 42 and the second non-overtrained neural network may be analyzed by the neural networks 42, 44 and automatically rated with a confidence score. When the confidence score passes below a predetermined threshold for messaging an expert team, the expert team associated with the input question being answered can be notified. The expert team can then respond with a precise answer, which is then usable for subsequent training of the compound chatbot 20.

Furthermore, in certain implementations, the automatic messaging system 22 may notify (e.g., via an electronic message (e.g., an email)) support staff using the support staff systems 14 when an expert team has resolved a question or problem posed to the compound chatbot 20 for which the compound chatbot 20 had difficulty answering (e.g., as may be indicated by low confidence scores associated with the answers proffered by the compound chatbot 20).

Note that after training of the compound chatbot 20, e.g., by one or more developers, administrators, or other experts using the developer systems 12 to access and use chatbot training functionality of the chatbot trainer 36, the first overtrained neural network 42 will be overtrained, and the second neural network 44 will not be overtrained.

For the purposes of the present discussion, an overtrained neural network may be any neural network that is trained to produce approximately an exact fit (or as close of a fit that the training set and associated neural network will allow) between each input question of the training set and an answer of the training set. In such cases, the error signal (also called cost function or loss score herein) representing differences between answers output by the neural network being trained (e.g., the overtrained neural network 42) and answers of the training set is driven as low as possible, e.g., to approximately zero or otherwise to an approximate minimum, given the training set. This is done by iteratively adjusting neural network weights and/or other parameters responsive to the error signal, to thereby drive the error signal to zero or approximately zero. The terms overtrained, over fit, and curve fit may be employed interchangeably herein.

An overtrained neural network is said to memorize (or approximately memorize) the training data, as a direct correspondence between (or mapping between) training-set questions and training-set answers is established during training. In other words, the overtrained neural network 42 is fit precisely to the training data, e.g., data maintained among the conversation records 46 and distilled solution documents 48 of the knowledge base 30.

Generally, overfitting a neural network may enable the neural network to exhibit excellent performance when subjected to input questions that match or approximately match training-set questions. An overtrained neural network may be fit so precisely to the training-set data that it may fail to accurately account for additional data or otherwise reliably predict future observations. The ability of a neural network to be precisely fit to training-set data so as to drive the error signal or cost function to zero can be a function of the complexity and parameterization of the neural network. For example, very simple neural networks with relatively few hidden layers and accompanying cells may have difficulty driving the error signal to zero for large training datasets. Nevertheless, for the purposes of the present discussion, the neural network is still considered to be overtrained if the error signal or cost function is approximately minimized given the capabilities of the neural network to be optimized to fit the training-set data.

However, note that an overtrained neural network may output substantially degraded or inapplicable answers when subjected to questions that are substantially different than questions included in the training set. Use of the second non-overtrained neural network 44 overcomes any such degradation that may occur at the output of the overtrained neural network 42 when responding to questions for which the overtrained neural network has not been trained. Accordingly, the compound chatbot 20 can exhibit the benefits of precise answers to computing-environment related questions as afforded by the overtrained neural network 42, and can also exhibit the benefit of the second non-overtrained neural network 44 in responding to more general questions that cannot be precisely answered by the first overtrained neural network 42.

In the present example embodiment, the overtrained neural network 42 is a deep learning recurrent neural network employing Long Short-Term Memory (LSTM) cells of the general type that may be used for language translation. Note that use of LSTM cells in recurrent neural networks may facilitate implementing a type of contextual memory that enables mitigating the vanishing gradient problem that can occur when training neural networks and adjusting internal parameters or weights thereof. Generally, the LSTM cells facilitate preserving the error signal (or cost function) for backpropagation through the neural network layers, thereby enabling the associated recurrent neural networks 42, 44 to continue learning over multiple training steps, and thereby facilitating learning cause-and-effect relationships between different or widely separated testing cycles.

For the purposes of the present discussion, an LSTM cell may be any neural network cell or building block with one or more features (e.g., an input gate, an output gate, and a forget gate) enabling the building block to selectively store values, information, or effects thereof, thereby mitigating the vanishing gradient problem.

A recurrent neural network may be any neural network with cycles and/or feedback loops, such that prior outputs by the network and/or one or more cells or components thereof are fed back as input to the one or more cells, components, and/or to the network itself. Recurrent neural networks can often be graphically visualized by a process called unfolding the network in time, which can assist in manually calculating weight/parameter adjustments during a process called back-propagation in time, whereby the weights/parameters are iteratively adjusted to selectively reduce errors in answers produced by the neural network.

Note that the art of design and construction of neural networks (and especially recurrent neural networks with LSTM cells used for language translation) often teaches away from overtraining of the neural networks, so as to not produce excessively erroneous or inapplicable answers to questions that vary substantially from questions of the training set. For example, a hypothetical overtrained neural network used to drive an autonomous or semi-autonomous vehicle that is trained using a dataset that only includes left turns might learn to always turn left in practice, thereby making errors in cases where the vehicle should actually turn right.

However, in the present example embodiment, questions or problem statements are generally limited to specific problems or questions pertaining to the computing environment and accompanying cloud. Accordingly, differences between actual questions asked of the compound chatbot 20 during use, and questions used to train the compound chatbot 20 can become relatively small, as the training set data 46, 48 becomes increasingly large or detailed. As such, by overtraining the first neural network 42, the accompanying compound chatbot 20 can provide very precise and accurate answers as output of the first overtrained neural network 42. Without use of the overtrained neural network 42, answers output by the compound chatbot 20 may not be as precise or accurate.

The present example embodiment overcomes any issues when answering out-of-sample questions (i.e., questions that substantially vary from corresponding questions of the training set) which may produce substantially erroneous output from the overtrained neural network 42, by monitoring an answer confidence score for the overtrained neural network 42, and then selectively switching to use of the non-overtrained neural network 44 when the confidence score passes below a predetermined threshold. Note that this threshold may be the same as or different than the threshold used to selectively trigger the automatic messaging system 22 to email or otherwise notify experts of the developer systems 12 and/or technicians of the support staff systems 14.

Note that question variance, i.e., a measurement or indicator of the difference between a question input to the compound chatbot 20 and one or more questions of the training set (e.g., data from the records 46 and/or distilled solution documents 48) can be used facilitate generating a confidence score for an answer output by the overtrained neural network 42. The confidence score may be determined up front, before particular question inputs are provided to the overtrained neural network 42, and/or using code contained within or at the output of the overtrained neural network 42. Accordingly, the confidence score measurement may alternatively (or in addition) be based on analysis of an actual answer output by the overtrained neural network 42.

Those skilled in the art will access to the present teachings may readily implement (e.g., by purchasing, coding, or modify existing code) confidence-scoring mechanisms and accompanying neural networks 42, 44 discussed herein to meet the needs of a given implementation without undue experimentation.

In the present example embodiment, the non-overtrained neural network 44 is trained with a broader training set than that used for the overtrained neural network 42. For example, in addition to the records 46 and distilled solution documents 48 of the knowledge base 30, information from more remote knowledge sources, e.g., from a cloud accompanying the system 10, information about technical domains (e.g., technological fields) applicable to the system and accompanying computing environment, and so on, to train the second neural network 44.

The second neural network 44 is not overtrained, such that the internal weights and/or other parameters thereof are not maximally optimized to exactly fit the training data set. Those skilled in the art will appreciate that various methods may be employed to ensure that the second neural network 44 is not overtrained. These methods may include, for example, regularization; adding noise data to the training set; selectively stopping training before optimization or fitting (to the data of the training set) is complete; using specialized hyper parameters, and so on.

In an example scenario, after developers and/or other experts use the developer systems 12 and chatbot trainer 36 to train the compound chatbot 20 (including to train the overtrained neural network 42 and the non-overtrained neural network 44), the compound chatbot 20 is then activated for use by the support personnel UI code 38.

The support personnel (e.g., a technician) may converse with a customer, contractor, or other entity using the customer systems 16, whereby the customer poses a problem statement or question to the technician using the support staff systems 14. The technician then logs into the compound chatbot 20 using the support personnel UI code 38 and enters the question.

The compound chatbot 20 determines whether the overtrained neural network 42 can generate a precise or accurate answer for the question, e.g., by checking a question variance measurement or confidence score (to ensure that it is above a predetermined threshold) for an answer to be provided by the overtrained neural network 42. If the overtrained neural network 42 can provide a sufficiently high-confidence answer to the question, then the compound chatbot 20 makes the answer available to the technician via the support personnel UI code 38.

If the overtrained neural network 42 cannot provide a sufficiently high-confidence answer to the question, the question is then forwarded to the non-overtrained recurrent neural network 44, which then answers the question and provides corresponding output to the support personnel UI code 38 for rendering using the support system UI 32.

The compound chatbot may also provide the question to the search engine 24, the results of which may also be made available for display via the support system UI 32, in combination with any answers provided by the compound chatbot 20 and accompanying neural networks 42, 44. The search engine 24 may be an index-based search engine that searches indexed content based on keyword scoring methods. Other types of search engines may also be used, without departing from the scope of the present teachings.

Note that implementations of the system 10 may vary, without departing from the scope of the present teachings. For example, in certain implementations, the customer systems 16 may be given direct access to use the compound chatbot 20, without first needing to converse with support staff using the support staff systems 14.

Note that the compound chatbot 20 may be periodically trained, e.g., daily, as new data that can be used for training is collected in the knowledge base 30. The training may be implemented using periodic supervised learning. However, in other implementations, the neural networks 42, 44 can be configured to learn by themselves as they are operating, i.e., via unsupervised learning.

In summary, the compound chatbot 20 and accompanying neural networks 42, 44 can be trained using question and answer pairs, where the answers have been provided by experts, e.g., developers or engineers using the developer systems 12. The first neural network 42 is overtrained so as to provide very precise specific answers. The art generally teaches away from overtraining recurrent neural networks (e.g., so as to avoid the potential for nonsensical answers) and various techniques can be used to avoid overtraining.

In the present example embodiment, the problem domain, i.e., the technical support domain pertaining to the cloud-based computing environment 10 (which may represent an enterprise computing environment) exhibits very specific questions that can call for very specific or precise answers; not just close answers. This need is met by use of the overtrained neural network 42, which can provide a first level of customer support.

The second neural network 44 is not overtrained, and can be used to answer questions for which the overtrained neural network 42 may provide nonsensical or inapplicable answers, e.g. when the question to be answered substantially diverges or varies from questions used to overtrain the first neural network 42. Such a divergent question may be called an "out of sample" question, which can then be passed to the second non-overtrained neural network 44.

The second non-overtrained neural network 44 can provide a close guess or estimate for the answer, particularly in cases when an exact or precise answer is not available from the overtrained neural network 42. The second non-overtrained neural network 44 can facilitate providing a second level of technical support.

In the present example embodiment, the neural networks 42 are recurrent neural networks employing Long Short-Term Memory (LSTM) cells in their hidden layers. A cost function, such as cross-entropy loss scoring, may facilitate determining how close a given chatbot answer is to the correct human answer, i.e., the error in the answer output. This error can be used for neural network backpropagation, so as to adjust neural network weights and parameters during training, e.g., so as to selectively reduce errors in answers during training, as discussed more fully below.

Figure 2:
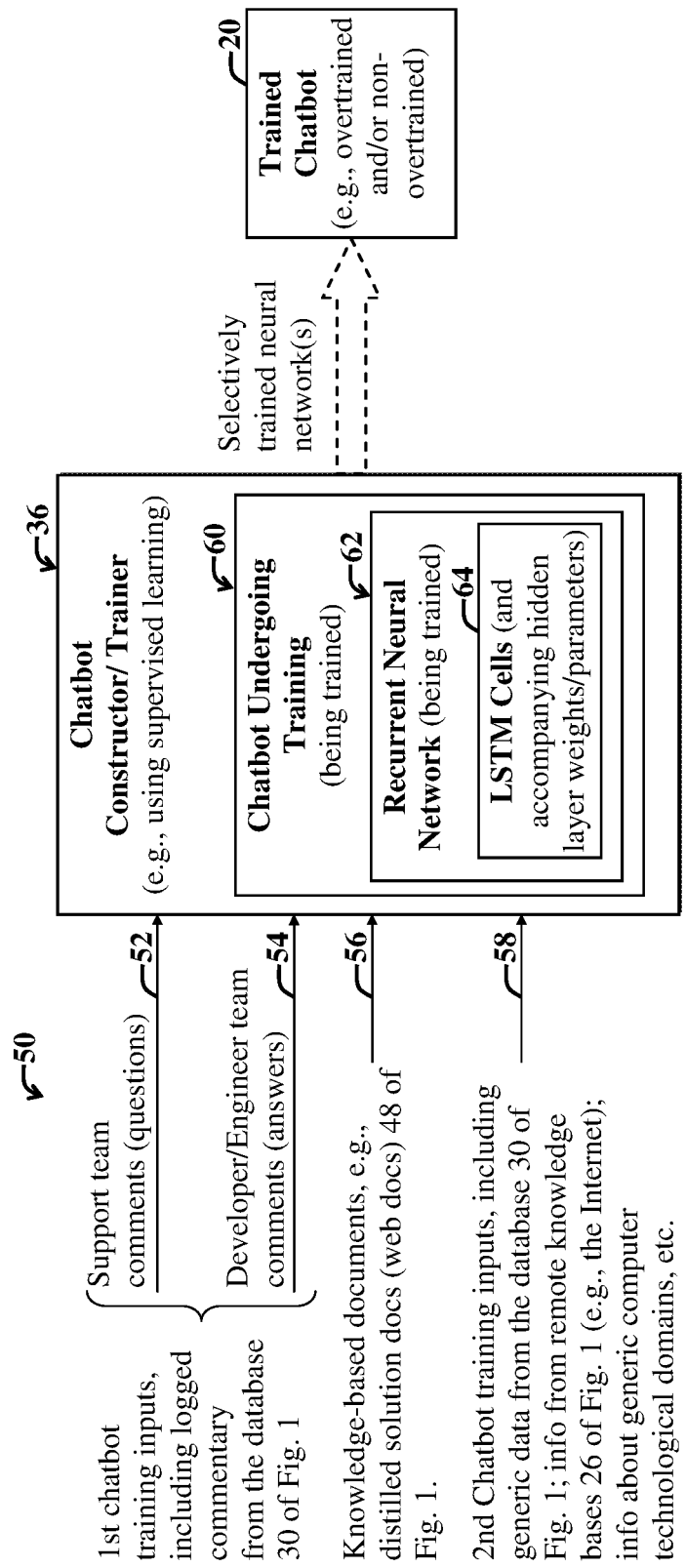
FIG. 2 is a second block diagram illustrating additional example details of the chatbot trainer/constructor module of FIG. 1, including example inputs used to train the neural networks of the compound chatbot of FIG. 1.

FIG. 2 is a second block diagram illustrating additional example details of the chatbot trainer/constructor module 36 of FIG. 1, including example inputs 50 used to train the neural networks 42, 44 of the compound chatbot 20 of FIG. 1.

The inputs 50, also called training-set data or training data, includes support-team comments 52 and developer team comments 54. The support team comments 52 are treated as questions, and the developer team comments 54 are treated as answers for the purposes of training a neural network 62 of the chatbot undergoing training 60, using supervised learning. Knowledge-based document input 56 (e.g., corresponding to data of the distilled solution documents 48 of FIG. 1) can also be treated as answers to be selectively included among chatbot output.

In the present example embodiment, when overtraining the neural network 62, hidden layer weights 64 (of accompanying LSTM cells) of the recurrent neural network 62 are selectively adjusted so that each input question 52 gets mapped to a specific answer 54, 56. In this way, the recurrent neural network 62 undergoing training will learn to output the correct answers when it receives a question that is similar to one of the training questions 52.

When the recurrent neural network 62 undergoing training is to implement the non-overtrained neural network 44 of FIG. 1, then additional, more generic training data 58 may be used to form question and answer pairs for training. The more generic training data may include data from remote sources (e.g., from the remote knowledge base 26 of FIG. 1), e.g., general cloud data, data sourced from the Internet, and so on. When avoiding overtraining, the hidden layer weights 64 are not adjusted so that all training questions map exactly to specific training answers. Those skilled in the art with access to the present teachings may readily overtrain or not overtrain a recurrent neural network, so as to meet the needs of a given implementation, without undue experimentation.

After the chatbot 60 and accompanying recurrent neural network(s) 62 is trained and the hidden layer weights 64 adjusted accordingly, the resulting trained chatbot 20 may be activated for use as the compound chatbot 20 of FIG. 1, and/or for use as a constituent chatbot within the compound chatbot 20.

Figure 3:
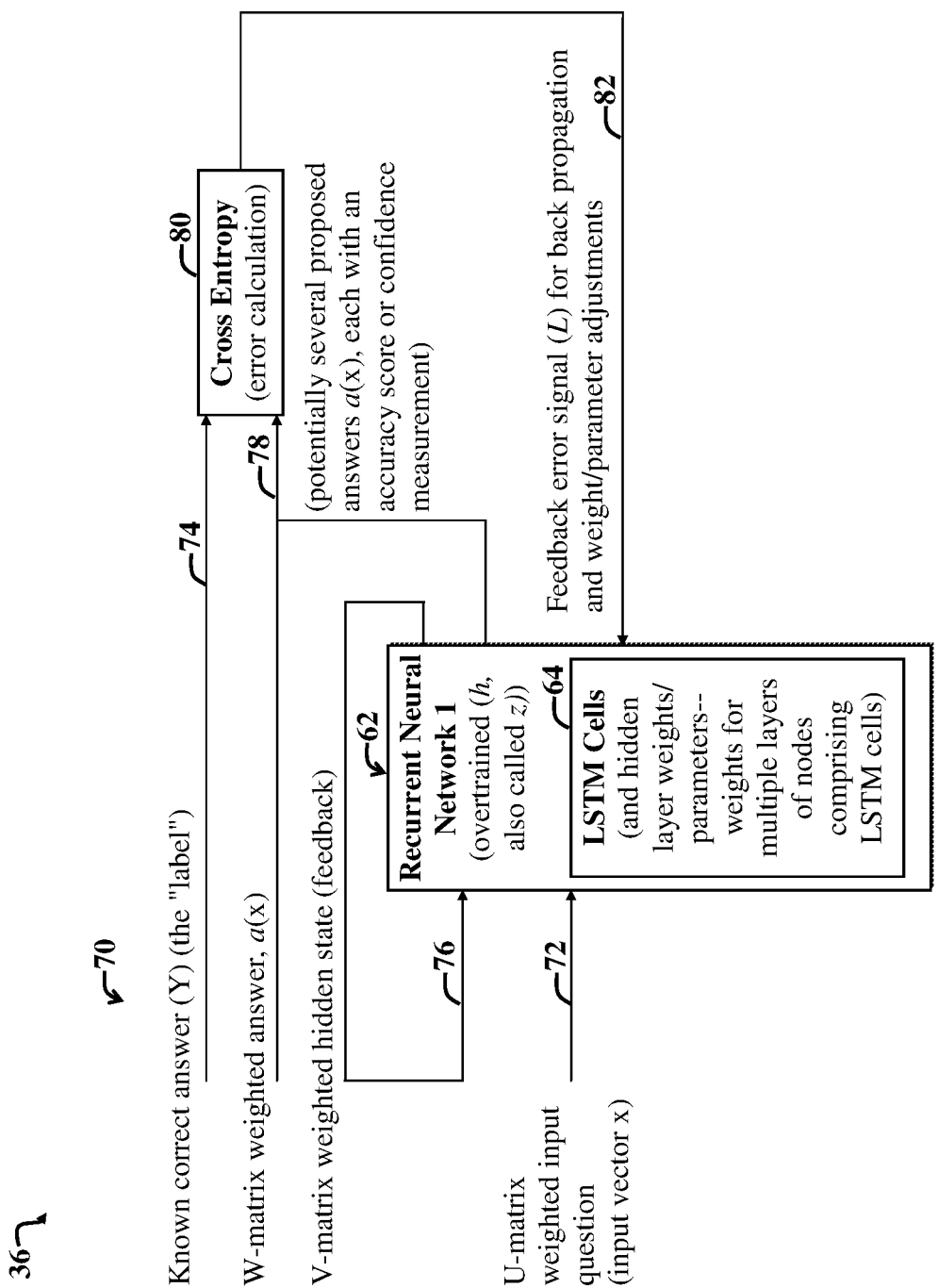
FIG. 3. is a third block diagram illustrating further example details and concepts, e.g., error signal (also called loss signal or cost function) calculation and back propagation that the chatbot trainer/constructor module of FIG. 2 can use to train a neural network.

FIG. 3. is a third block diagram illustrating further example details and concepts, e.g., further illustrating error signal calculation and back propagation that the chatbot trainer/constructor module 36 of FIG. 2 can use to train a neural network 62. Note that the trainer 36 of FIG. 3 is merely illustrative, and that in practice, implementation of certain modules, e.g., a cross-entropy calculation 80, may occur in a distributed fashion within the recurrent neural network 62.

The neural network 62 being trained receives an input question 72, which may be represented as a weighted (e.g., weighted by values of input matrix, called the U matrix herein) vector (x) 72. The recurrent neural network 62 then provides an output vector (which may be weighted by weights of an output matrix, called the W matrix herein) a(x) 78.

Hidden layer LSTM cells that exhibit adjustable internal weights 64 receive feedback 76. This helps to incorporate the effects of prior decisions by the recurrent neural network 62, enabling the prior decisions to essentially be remembered by accompanying LSTM cells that apply the hidden layer weights 64 to their inputs using nonlinear activation functions (e.g., the sigmoid function).

In the present example embodiment, after the recurrent neural network 62 computes an output answer a(x) 78 for a given input (x) question 72, the cost function or error calculation 80 estimates how much the answer 78 deviates from a known correct answer (called the "label"). A resulting error signal or cost function measurement 82 is then used during a process called backpropagation, which involves selectively adjusting the hidden layer weights 64 so as to reduce the error signal.

The process is then repeated for various other training-set inputs 72, until the hidden layer weights have been sufficiently optimized for a given neural network to be trained. When training the overtrained neural network 42 of FIG. 1, the hidden layer weights may be approximately maximally optimized, so as to drive the cost function output 82 to approximately zero for each training-set input question 72.

Those skilled in the art may readily implement cost function calculations and backpropagation in the recurrent neural network so as to meet the needs of a given implementation, without undue experimentation.

Note that the cost function, e.g., cross-entropy calculation 80, may also be used to score output answers during use of the recurrent neural network 62, and not just during training. The score, or error calculation may be used to selectively switch from using an overtrained neural network or a non-overtrained neural network to answer a particular question, as discussed more fully below. Alternatively, or in addition, another type of method may be used to determine a confidence level for an output of a given recurrent neural network for use in selectively switching between use of overtrained and non-overtrained neural networks to answer questions.

Note that use of LSTM cells in in various embodiments discussed herein can facilitate remembering conversation context occurring in training set. Context information gleaned from the training set conversations may be remembered by the LSTM cells 64 and facilitate precisely answering input questions. Generally, the LSTM cells 64 may facilitate preserving the error signal (or cost function value) that can be back propagated through the recurrent neural network 62, thereby overcoming the gradient vanishing problem during backpropagation.

A given LSTM cell may include an input gate for controlling the flow of new values into the LSTM cell; a forget gate for controlling which values remain in the LSTM cell; and an output gate for controlling which value(s) in the LSTM cell is used to compute the output (also called the activation (h)) of the LSTM cell.

An example of a cross-entropy calculation of a loss signal (L) involves use of the following equation:

$$L(X,Y) = -\frac{1}{n}\sum_{i=1}^{n}(y^i \ln a(x^i) + (1-y^i)\ln(1-a(x^i))),$$

where $X=\{x^i, \ldots, x^n\}$ represents the set of input examples 72 in the training set; $Y=\{y^i, \ldots, y^n\}$ is the corresponding set of labels 74 (i.e., known correct answers for the corresponding input examples X); a(x) 78 represents the output of the neural network 62 given an input (x) 72, Each $y^i$ is either 0 or 1. The output a(x) 78 can be restricted to the open interval (0, 1) using a logistic sigmoid. For example, for a one-layer neural network, the output (also called the activation) a(x) may be:

$$a(x) = \frac{1}{1+e^{-Wx-b}},$$

where W is a weight matrix, and b is a bias vector.

For multiple layers, the activation function can be expanded:

$$a(x) = \frac{1}{1+e^{-Wz(x)-b}}$$
$$z(x) = \frac{1}{1+e^{-Vx-c}}$$

Where V and c are the weight matrix and bias, respectively, for the first layer, and z(x) is the activation (output) of the hidden network layer.

Figure 4:
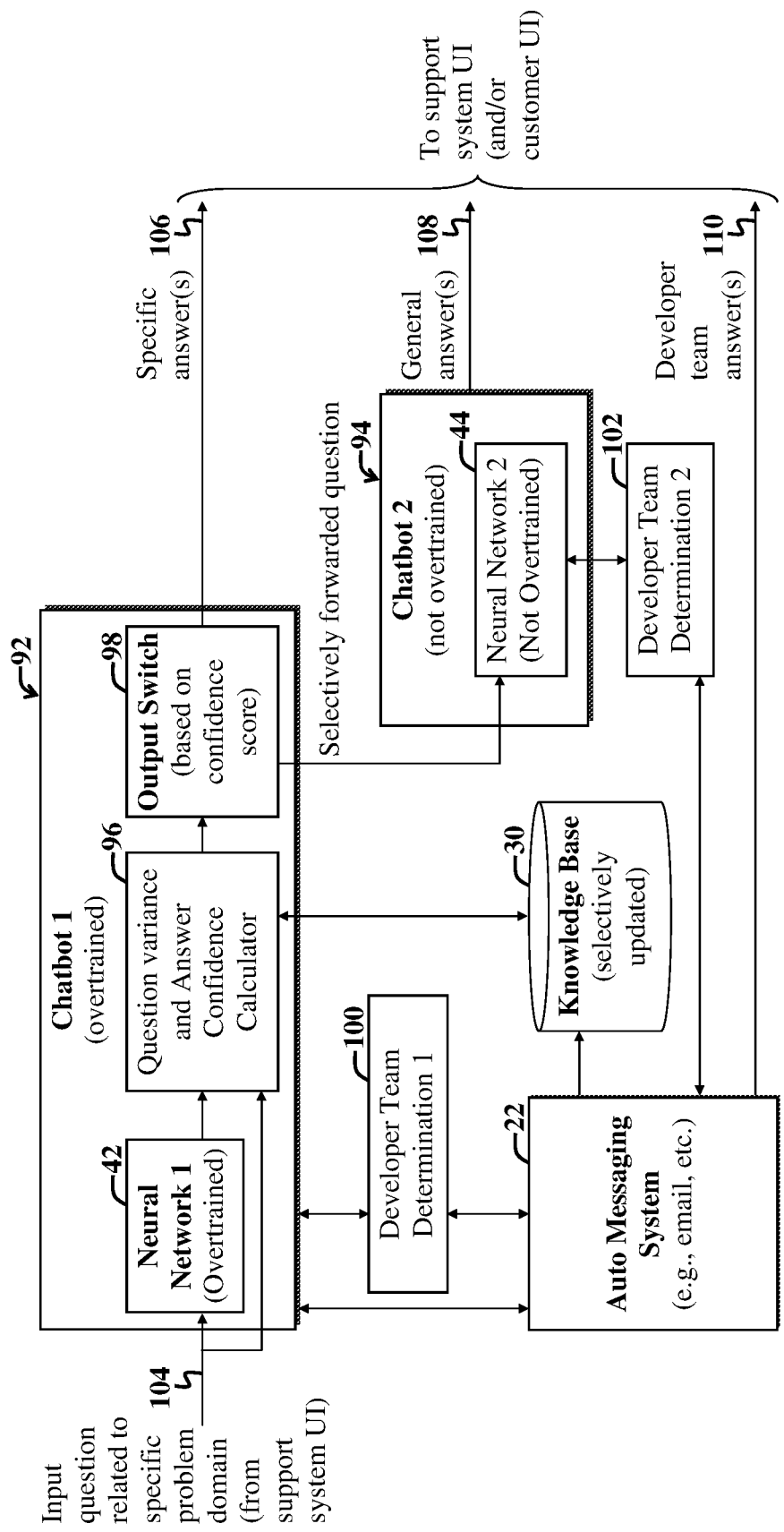
FIG. 4 is a fourth block diagram illustrating additional example details of how two chatbots of a compound chatbot may be used to selectively provide different output answers in response to a given input question.

FIG. 4 is a fourth block diagram illustrating additional example details of how two chatbots 92, 94 of a compound chatbot may facilitate providing different output answers 106-110 in response to a given input question. The chatbots 92, 94 may be implemented in the compound chatbot 20 of FIG. 1.

The first chatbot includes the first overtrained neural network 42, a question variance and answer confidence calculator 96, and an output switch 98. The overtrained neural network 42 receives an input question 104 for which one or more answers 106-110 are to be output, e.g., for display via one or more of the computer systems 12-16 of FIG. 1.

The input question 104 can also be input to the question variance and answer confidence calculator 96, which may also receive an initial answer to the input question 104, as provided by the first overtrained neural network 42. The question variance and confidence calculator 96 includes code for analyzing the answer output by the first overtrained neural network 42.

The confidence calculation can use the cross-entropy cost function 80 of FIG. 3. Alternatively, or in addition, the confidence in the output answer provided by the overtrained neural network 42 is computed by analyzing the input question 104 and determining (with reference to training data maintained in the knowledge base 30) whether or not the input question 104 varies substantially from questions of the training data, i.e., whether or not the input question 104 or a similar question has been used as a part of training of the overtrained neural network 42.

The answer provided by the first neural network 42 is passed through the question variance and answer confidence calculator 96, whereby the answer can be tagged with metadata indicating a score for the answer. The output switch 98 includes code for comparing the score to a predetermined threshold, below which the second chatbot 94 is activated. If the answer output by the overtrained neural network 42 exhibits a confidence score surpassing the threshold, then the answer is output from the first chatbot 92 as a specific answer 106. The specific answer 106 can then be provided, for instance, to the support personnel UI code 38 of FIG. 1, in preparation for display of the answer via the support system UI 32 and/or customer support UI 34 of FIG. 1.

Note that the relative positions of the question variance and answer calculator 96 and output switch 98 may vary, depending upon the needs of a given implementation. For example, in certain implementations, where the calculator 96 can estimate up front whether or not the first neural network 42 will be able to sufficiently precisely answer the input question 104, then the calculator 96 may be positioned in front of the neural network 42. In that case, the input question 104 may be immediately forwarded to the second non-overtrained chatbot 94, and any answer from the overtrained neural network 42 may be withheld or not calculated.

Generally, when the question variance and answer confidence calculator 96 determines or estimates that an answer output by the first neural network 42 will not be sufficiently precise (i.e., will exhibit a confidence score that is less than the predetermined score threshold), then the input question 104 is forwarded to the second chatbot 94 for handling.

When the calculator 96 determines that the overtrained neural network 42 cannot sufficiently precisely answer the input question 104, then additional processes (e.g., in addition to activation of the second chatbot 94) may be launched. For example, a first developer team determination module 100 may be activated to determine or record which expert team and/or expert individual (e.g., expert engineer) is most likely to be able to answer the input question 104. Accordingly, the developer team determination module 100 can be used for intelligently routing support questions (e.g., the input query 104) to the most qualified engineer (i.e., qualified to answer a given input question) based on a learning result (e.g., a result output by the overtrained neural network 42 and/or the first developer team determination module 100) of the first chatbot 92. Hence, the first chatbot 92 and accompanying developer team determination module 100 can incorporate code for determining not just the preferred developer team (or other expert team), but also (or alternatively) one or more preferred expert individuals that are most qualified to answer the input query (also called support question) based on learning implemented via the first neural network 42 and/or the developer team determination module 100.

The identified developer team may then be notified of the input question (e.g., by email) via the automatic messaging system 22. When the experts (e.g., members of a developer or engineering team) respond with an answer to the input question 104, the answer may then be forwarded to the knowledge base 30 for use in subsequent training runs for the neural networks 42, 44.

In the meanwhile, the second chatbot 94 can be forwarded the input question 104 for handling via the non-overtrained neural network 44. The non-overtrained neural network 94 may then provide a more general answer 108 to the specific input question 104, while developer teams are working on a more precise response. When developer teams have developed a more precise response, the answer can be forwarded to not just the knowledge base 30, but can also be provided as a developer team answer 110, which can also be displayed via one or more of the computer systems 12-16 of FIG. 1.

Similarly, in certain implementations the second chatbot 94 may also include a question variance and answer confidence calculator, and may also use a second developer team determination module 102 to notify any developer teams and/or individuals (that have been identified as possibly wishing to analyze the general answer 108) and make any responsive adjustments in response thereto, e.g., adjustments to the training data used to train the second chatbot 94.

Those skilled in the art will appreciate that, while not shown among the chatbots 92, 94 or accompanying neural networks 42, that the chatbots and/or neural networks 42 incorporate natural language processors to facilitate translating or estimating meanings or intent of input questions, and enabling deep machine learning of the neural networks 42, 44.

For the purposes of the present discussion, a deep neural network may be any neural network with multiple layers, called hidden layers between input and output layers. A deep learning algorithm may be any algorithm or method for processing and transforming or mapping an input representation of data to a different output representation. Deep learning algorithms may involve processes such as feature extraction, pattern recognition, data classification, and so on. The terms deep learning and deep machine learning may be employed interchangeably herein.

Note that while not explicitly shown in the diagrams, the chatbots 92, 94 will include Natural Language Processing (NLP) components for facilitating processing natural language inputs, e.g., entered questions, statements, and so on (which can be typed, spoken, cut and pasted, provided via a form in a specific format, etc.); estimating an intent or meaning of the input; and providing corresponding natural language output.

For the purposes of the present discussion, natural language may be any speech or representation of speech, i.e., spoken or written language. Similarly, natural language input may be any question or statement, e.g., instruction, request, or other information provided via spoken or written human language to a computer. Examples of language input usable with certain embodiments discussed herein include voice commands, text messages (e.g., Short Message Service (SMS) text messages), and emails containing text, direct text entry, and so on. The terms "natural language input" and "language input" may be employed interchangeably herein.

Note that in certain implementations, natural language input to the chatbots 92, 94 can be confined to a particular format to facilitate processing. For example, the inputs can include parameters or fields for identifying error codes or strings obtained from a log file. Generally, the present example embodiment and use of the dual chatbots 92, 94 can be particularly beneficial for answering questions characterizing a technical domain or other domain where virtually all of the expected or possible questions can be mapped to known or specific answers.

Figure 5:
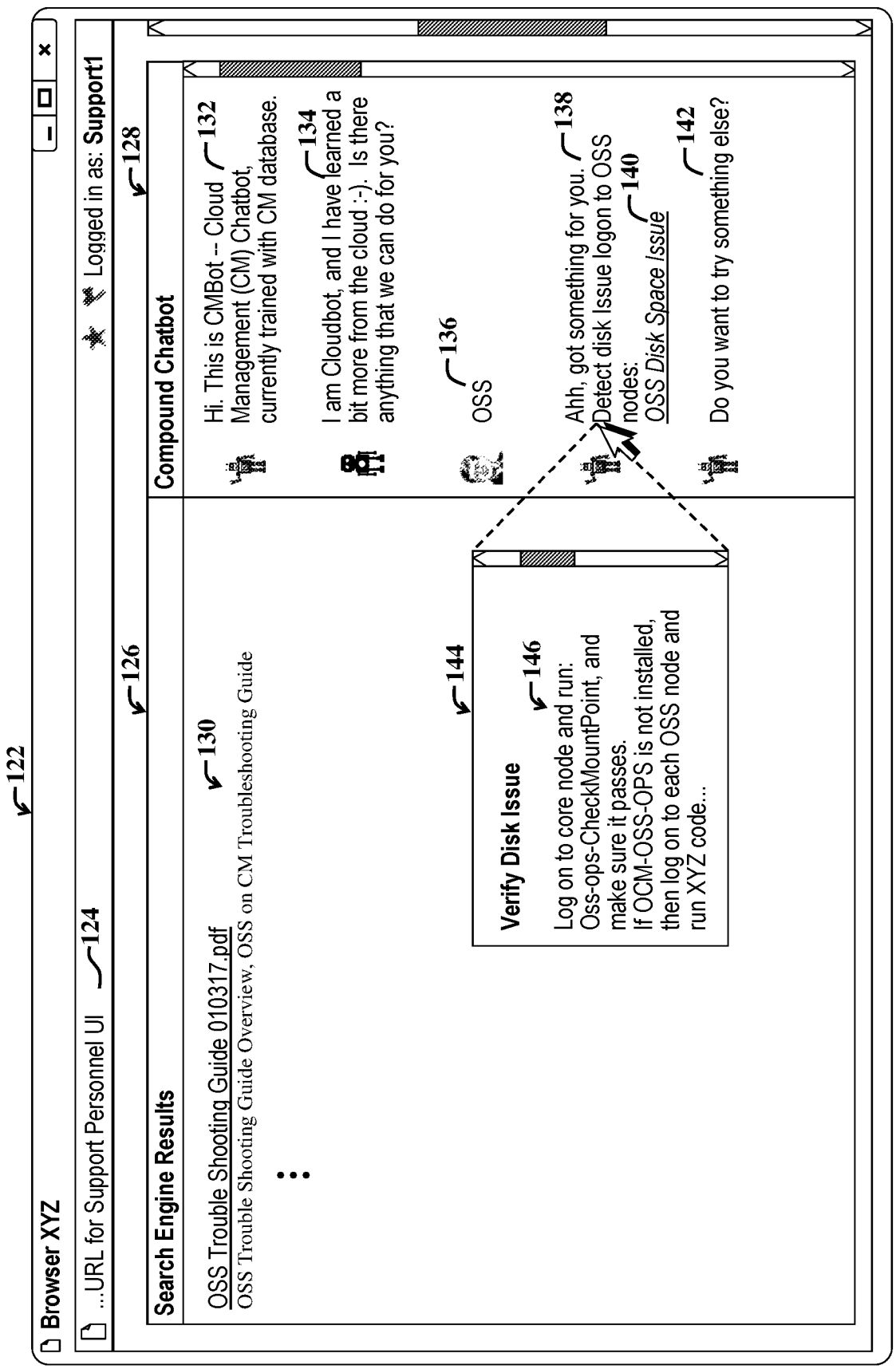
FIG. 5 illustrates a first example User Interface (UI) display screen that may be displayed via the support system UI of FIG. 1 in response to an example query, and further illustrating arrangement of content from two different chatbots and a search engine in the same UI display screen.

FIG. 5 illustrates a first example User Interface (UI) display screen 122 that may be displayed via the support system UI 32 and/or customer support UI 34 of FIG. 1 in response to an example question or statement, and further illustrating arrangement of content 132, 134, 138, 42, 146 from two different chatbots and search engine content 130 in the same UI display screen 122.

With reference to FIGS. 1 and 5, in the example UI display screen 122, a user, e.g., a technician using the support system 14 of FIG. 1 has browsed to a Uniform Resource Locator (URL) 124 for accessing the compound chatbot 20 of FIG. 1 and has logged into the support personnel UI 38 of FIG. 1 to access functionality and content provided by the compound chatbot 20.

The example UI display screen 122 includes a search engine section 126 and a compound chatbot conversation section 128. In the compound chatbot conversation section 128, the overtrained chatbot (associated with the overtrained neural network 42 of FIG. 1) and the non-overtrained chatbot (associated with the non-overtrained neural network 44 of FIG. 1) have introduced themselves with respective natural language outputs 132, 134.

The user then enters a query 136, which in this case is "OSS" (e.g., which may stand for Open Source Software). The overtrained chatbot then responds with an answer 138. Additional content 146 of the answer can be shown in a hover layer 144 that can be displayed upon user mouse-over or selection of the answer 138. The answer may also include additional features, such as links 140 to other resources. The hover layer 144 may be overlaid on an adjacent section 126 used to display search-engine results 130.

After providing the answer 138, the overtrained chatbot then asks the user if they would like additional assistance, e.g., via a responsive query 142.

Figure 6:
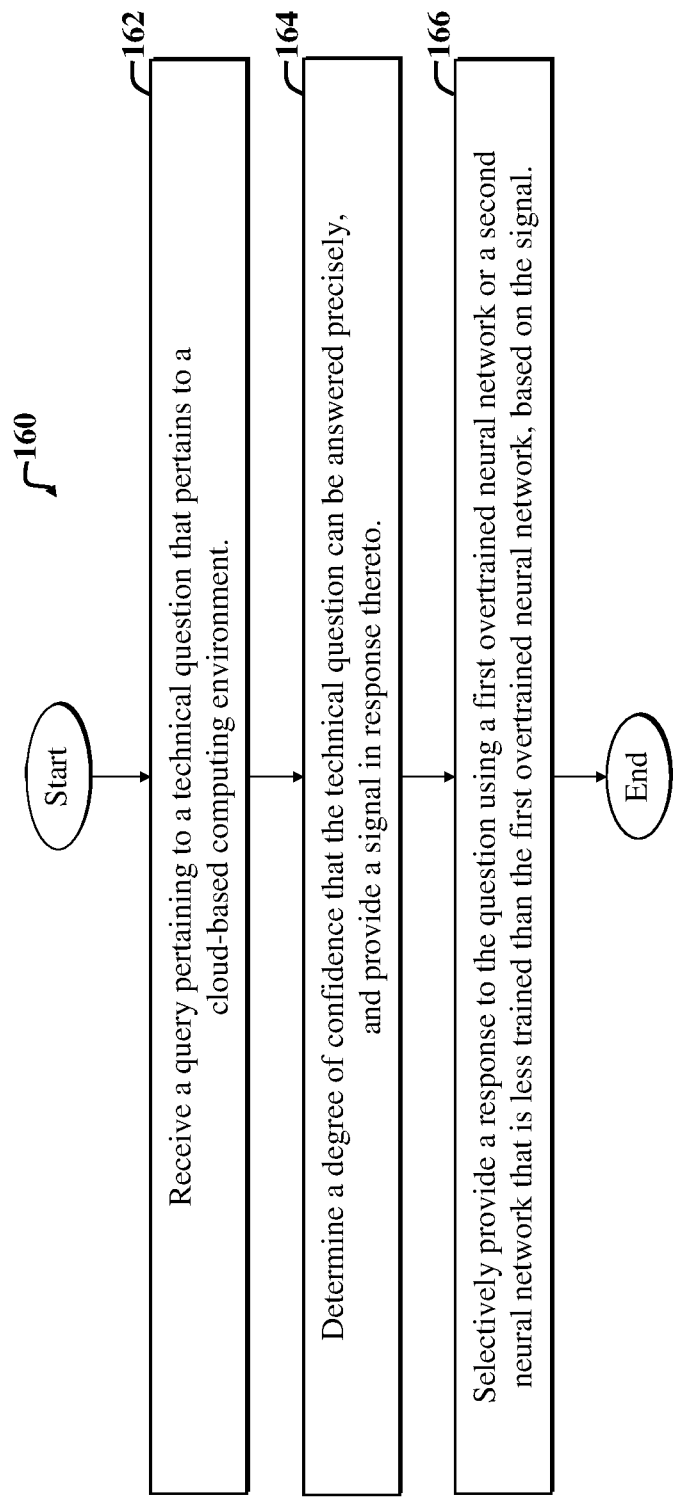
FIG. 6 is a first flow diagram of a first example method implementable via the embodiments of FIGS. 1-5.

FIG. 6 is a first flow diagram of a first example method 160 implementable via the embodiments of FIGS. 1-5. The first example method 160 facilitates providing answers to technical questions pertaining to a cloud-based computing environment, e.g., an enterprise computing environment.

A first query-receiving step 162 includes receiving a query pertaining to a technical question that pertains to the cloud-based computing environment. The query may be a problem statement, question, form entry, and/or one or more error codes, etc.

Next, a confidence-determining step 164 includes determining a degree of confidence that the technical question can be answered precisely, and providing a signal in response thereto. The determining step 164 may be performed, for example, by the question variance and answer confidence calculator 96 of FIG. 4.

Next, a responding step 166 includes selectively providing a response, i.e., answer to the question, using a first overtrained neural network (e.g., the first neural network 42 of FIG. 4) or a second neural network (e.g., the second neural network 44 of FIG. 2) that is less trained than the first overtrained neural network, based on the signal.

The first example method 160 may be modified, without departing from the scope of the present teachings. For example, the method 160 may alternatively recite receiving an input query pertaining to a computing environment; determining if the input query can be answered with a predetermined degree of confidence by a first neural network, and providing a first signal in response thereto; using the first neural network to generate a first answer to the query when the input query can be answered with the predetermined degree of confidence, as indicated by the first signal; and employing a second neural network to provide a second answer to the query when the query cannot be answered by the first neural network with the predetermined degree of confidence, as indicated by the first signal.

The first example method 160 may further specify that the first neural network includes an overtrained neural network, and the second neural network includes a non-overtrained neural network.

The first neural network and the second neural network may be recurrent neural networks with multiple layers of nodes comprising Long Short-Term Memory (LSTM) cells. The first neural network and the second neural network may be included as components of a compound chatbot and may represent modified versions of language-translation neural networks, i.e., neural networks used to translate statements from a first language into a second language.

The computing environment that the input question relates to may be an enterprise computing environment. The input query may represent a natural language technical support question or statement that is input to the chatbot by technical support personnel and/or by another person seeking an answer to a question, e.g., a customer, installer, contractor, etc.

The first neural network may be further adapted to determine determining a developer team associated with the question and/or first answer (i.e., the developer team or other expert team or individual identified as most likely to be able to accurately answer the question and/or to revise the chatbot answer). The first neural network may include code for further informing the identified developer team when the input query cannot be answered by the first neural network with the predetermined degree of confidence.

The first neural network and/or accompanying chatbot may further trigger automatic sending of an electronic message to the identified developer team, informing the developer team that a chatbot answer or ability to respond to a particular question may need improvement, i.e., may warrant further training of the chatbot and/or may warrant additional input or answers from the developer team.

The first example method may further include displaying the first answer and/or second answer in a first portion of User Interface (UI) display screen (e.g., corresponding to the compound chatbot section 128 of FIG. 5) and results of a search engine in another portion (e.g., the search engine results section 126 of FIG. 5) of the UI display screen. The search engine may be an index-based search engine, i.e., a search engine that employs indexing of content to be searched to facilitate searching of the content.

Figure 7:
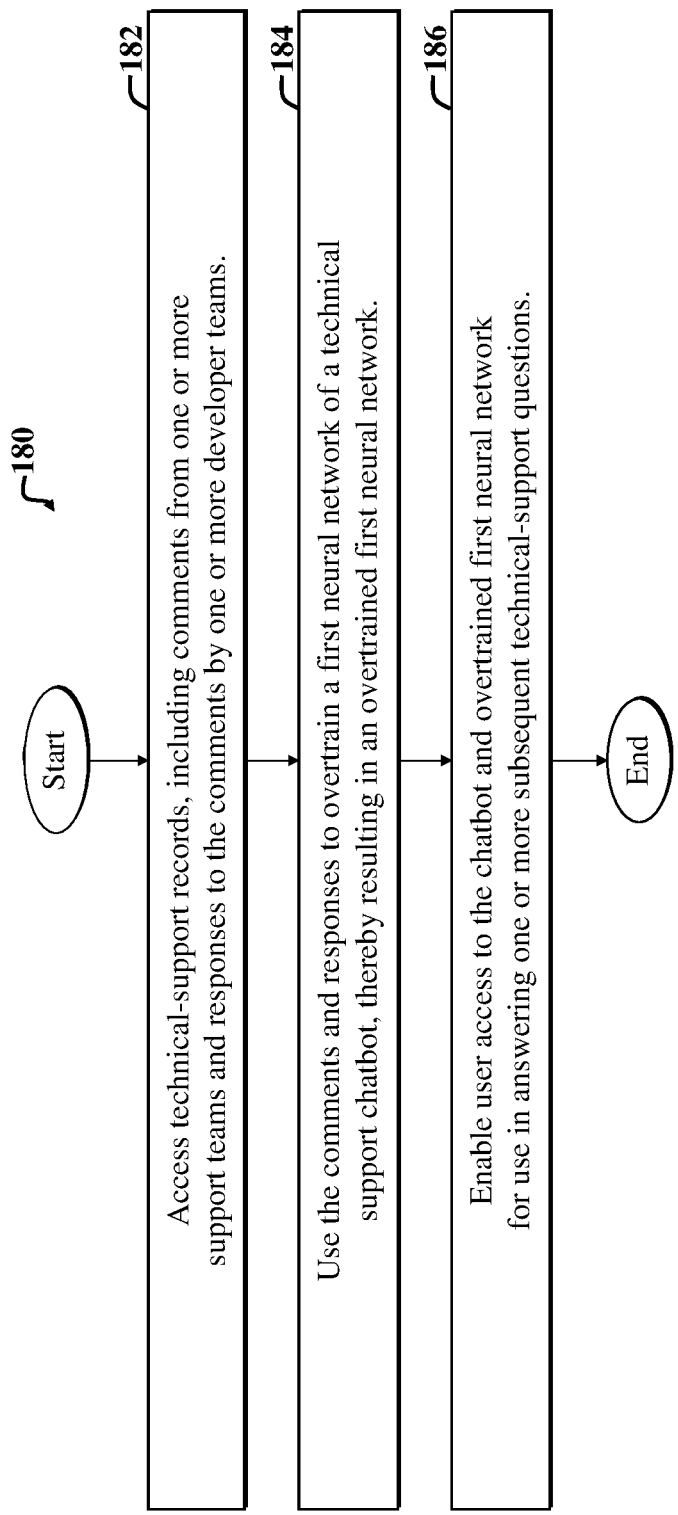
FIG. 7 is a second flow diagram of a second example method implementable via the embodiments of FIGS. 1-6.

FIG. 7 is a second flow diagram of a second example method 180 implementable via the embodiments of FIGS. 1-6. The second example method 180 facilitates implementing customer-support chatbot for an enterprise computing environment.

A first step 182 includes accessing customer-support records (e.g., the records 46 and solution documents 48 of FIG. 1), including comments from one or more support teams and responses to the comments by one or more developer teams.

A second step 184 includes using the comments and responses to overtrain a first neural network of the customer support chatbot, thereby resulting in an overtrained first neural network (e.g., the overtrained neural network 42 of FIGS. 1 and 5).

A third step 186 includes enabling user access (e.g., via the UI display screen 122 of FIG. 6) to the chatbot and overtrained first neural network for use in answering one or more subsequent customer-support questions.

Note that second example method 180 may be modified, without departing from the scope of the present teachings. For example, the method 180 may further include treating the comments as input questions to the first neural network; and considering the responses to be answers to the input questions for the purposes of overtraining the first neural network.

Overtraining of the first neural network may include minimizing a neural network error signal (e.g., the signal 82 of FIG. 3) using a training dataset that includes the customer-support records (e.g., the records 46 of FIG. 1). Minimization of the neural network error signal may include using backpropagation to adjust neural network weights in accordance with a current error signal during training until the neural network error signal is approximately zero or otherwise reaches a minimum given the training dataset.

The error signal may be computed using a cross-entropy calculation (e.g., via the cross-entropy module 80 of FIG. 3) to determine the error signal or cost function. The one or more of the answers may include or reference one or more knowledge-based documents (e.g., among the documents 48 of FIG. 1) that have been distilled from a conversation between the one or more support teams and the one or more developer teams pertaining to one or more technical-support issues.

The second example method 180 may further specify that the first neural network includes or represents a recurrent neural network with one or more LSTM cells. The method 180 may further include using generalized data (e.g., corresponding to the second chatbot training inputs 58 of FIG. 2) pertaining to one or more computer technology domains to train a second neural network of the chatbot, such that the second neural network is not overtrained.

The second example method 180 may further include estimating (e.g., via the question variance and answer confidence calculator 96 of FIG. 4) an ability of the first neural network to precisely answer a particular customer-support question, resulting in a confidence measurement; and selectively employing the first neural network or the second neural network to provide chatbot answer to the particular customer-support question based on the confidence measurement.

Accordingly, embodiments may use comments (e.g., corresponding to the records 46 of FIG. 1) in a technical service ticket as conversation building blocks to train neural networks, where comments from support teams are treated as questions, and comments from development teams are treated answers, which can be combined with the knowledge based documents to build and train neural networks for chatbots.

Hence, certain embodiments discussed herein provide deep learning systems and methods that can be particularly useful for cloud-based cloud based technical support automation, facilitating providing high quality technical answers to specific service areas.

Neural networks discussed herein, e.g., the overtrained neural network of FIG. 1, can be trained using question and answer pairs, with the question being the input to the neural network and the neural network output being an answer, which can then be compared with the human/correct answer (e.g., using a scoring formula) to update or correct the neural network weights.

Example methods may involve use of recurrent neural network with LSTM cells in for use in answering questions pertaining to technical support domain. Two neural networks (e.g., the neural networks 42, 44 of FIG. 1) can be employed. The first neural network (e.g., the overtrained neural network 42 of FIG. 1) is overtrained, so that the answer to a specific question is very specific and most likely the correct answer. Second neural network (e.g., the non-overtrained neural network 44 of FIG. 1) does not overfit/overtrain in case the question is different from the training questions to give a close guess at the answer should the first neural network give a really wrong answer. Sort of like the second level of support.

Cross-entropy loss scoring may be used to determine how close the answer produced by the neural network to a question is to the correct human answer in order to do back propagation to determine weights or parameters of neural network hidden layers. Use of the cross-entropy loss algorithm (as may be implemented via the cross-entropy module 80 of FIG. 3) may reduce the loss of data when the produced output is compared to the actual label (actual answer).

Calculation of the cross-entropy loss score (also called error signal herein) facilitates tuning a neural network being trained, via adjustments of weights thereof, so as to help ensure that the question can be mapped to a precise or correct answer.

When overtraining, the cross-entropy loss score may be successively calculated for each training question supplied to the neural network. The question and answer sets can be fixed and not changed during the training process. Tests of the training sets of question and answer pairs can be iterated to adjust hidden layer weights to successively reduce the cross-entropy loss score to a desired level, e.g., minimized or zero when overtraining a neural network.

Note that in certain alternative embodiments, input questions can be mapped to not just answers, but particular conversation records (and associated content) of the training data. The conversations can then be traced to a resolution to a problem or answer to a question that is detailed in the conversation. A given question can also be mapped to a particular software action, e.g., corresponding to the automatic sending of an email to an identified developer team.

Figure 8:
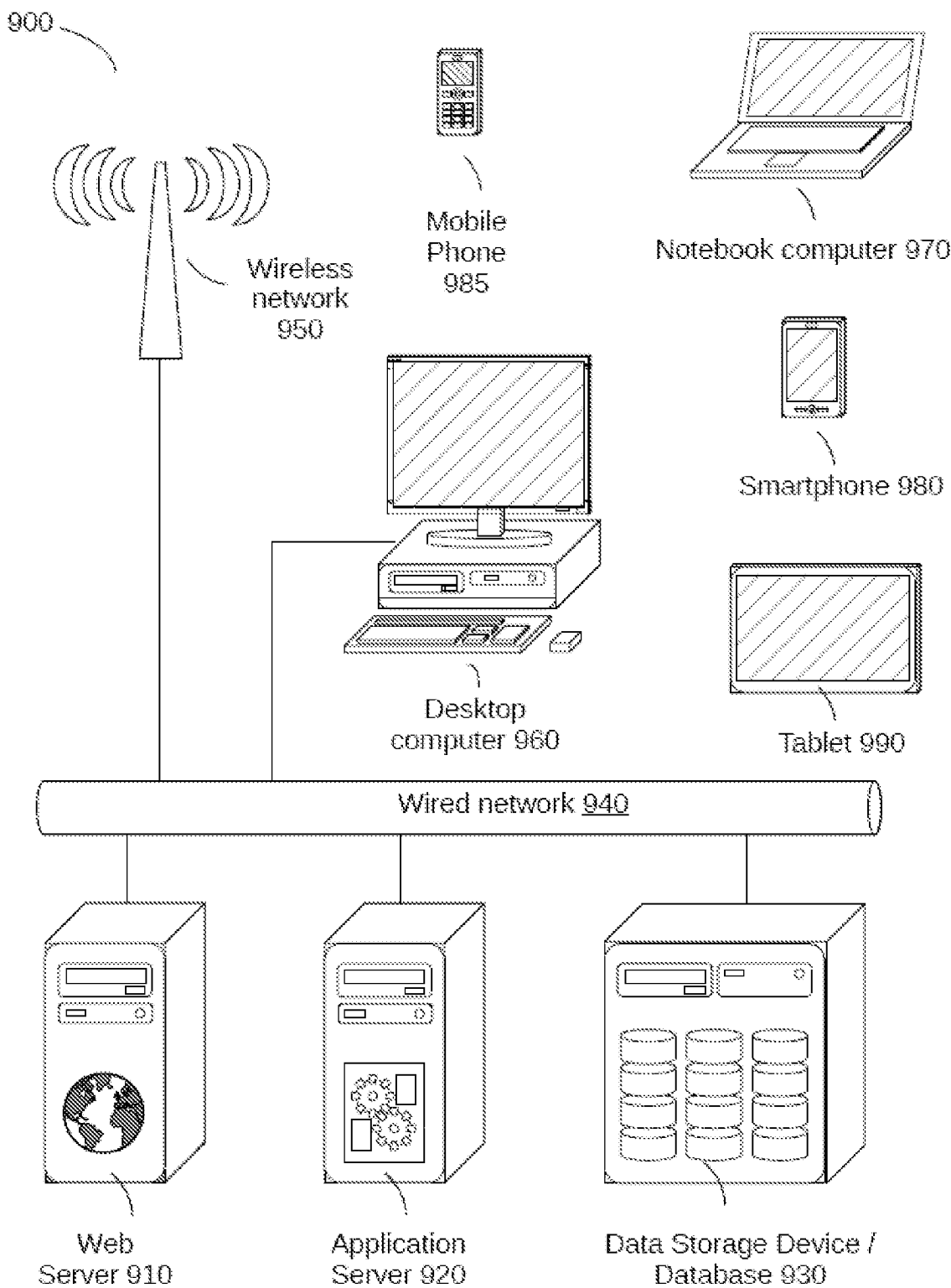
FIG. 8 is a general block diagram of a system and accompanying computing environment usable to implement the embodiments of FIGS. 1-7.

FIG. 8 is a general block diagram of a system 900 and accompanying computing environment usable to implement various embodiments discussed herein. For example, the example system 900 is usable to implement the example computing environment 10 of FIG. 1 and accompanying methods 160, 180 of FIGS. 6 and 7. Embodiments may be implemented using standalone applications (for example, residing in a user device) and/or using web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 8, the computing systems 12-14 of FIG. 1 may be implemented one or more of the user computers 960-990 of FIG. 8. The webpage code 18 may run on or be implemented via the web server 910 of FIG. 8. The compound chatbot 20, automatic messaging system 22 and search engine may run on one or more application servers, e.g., the application server 920 of FIG. 8. The knowledge base 30 may be maintained in the data storage device 930 of FIG. 8.

Figure 9:
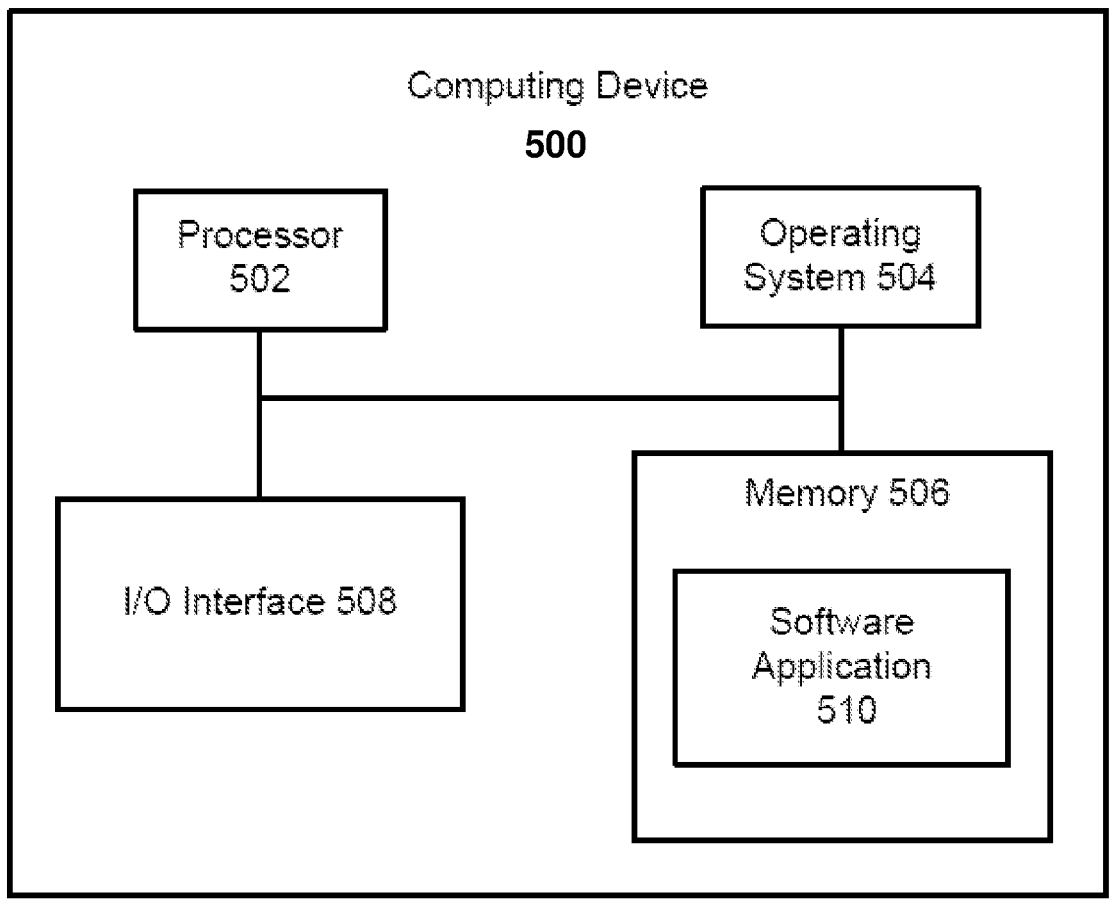
FIG. 9 is a general block diagram of a computing device usable to implement the embodiments of FIGS. 1-8.

FIG. 9 is a general block diagram of a computing device usable to implement the embodiments of FIGS. 1-3. While system 500 of FIG. 9 is described as facilitating performing the steps as described in certain implementations herein, any suitable component or combination of components of system 500 or any suitable processor or processors associated with system 500 may be used for performing the steps described.

FIG. 9 illustrates a block diagram of an example computing system 500, which may be used for implementations described herein. For example, computing system 500 may be used to implement server devices 910, 920 of FIG. 8 as well as to perform the method implementations described herein, e.g., to run the systems 12-16 of FIG. 1.

In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 9 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain embodiments discussed herein disclose selectively using an overtrained or non-overtrained neural network to answer a given technical question, that embodiments are not limited thereto. For example, both overtrained and non-overtrained neural networks may both provide answers simultaneously for viewing by a user of the system, without departing from the scope of the present teachings.

Furthermore, embodiments are not necessarily limited to use of LSTM cells in a recurrent neural network. For example, those skilled in the art may employ different Gated Recurrent Units (GRUs) or Neural Turing Machines (NTMs) with external memory accessible to an accompanying recurrent neural net to implement alternative embodiments.

While embodiments discussed herein preferably use sigmoid activation functions for their LSTM cells, embodiments are not limited thereto. For example tanh (hyperbolic tangent) functions may be used instead in some instances, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable storage device including logic for execution by one or more processors and when executed operable for facilitating generating answers to questions pertaining to a computing environment, by performing the following acts:

training a first neural network with a first training set that is based on answers from a developer/administrator system to questions from a support staff system, wherein the first training set overtrains the first neural network to provide exact fit between the answers and the questions associated with the first training set;

training a second neural network based on a second training set that includes information from remote knowledge systems, wherein the second training set is expert-based and is broader than the first training set, wherein the second training set undertrains the second neural network;

after the training of the first neural network and the second neural network, receiving an input query question pertaining to the computing environment;

determining if the input query question can be answered with a predetermined degree of confidence by the first neural network, and providing a first signal in response thereto;

using the first neural network to generate a first answer to the input query question when the input query question can be answered with the predetermined degree of confidence, as indicated by the first signal; and employing the second neural network to provide a second answer to the input query question when the input query question cannot be answered by the first neural network with the predetermined degree of confidence, as indicated by the first signal, wherein the second answer is a guess for answering the input query question.

2. The non-transitory processor-readable storage device of claim 1, wherein the first neural network includes an overtrained neural network, wherein the second neural network includes a non-overtrained neural network.

3. The non-transitory processor-readable storage device of claim 2, wherein the first neural network and the second neural network include recurrent neural networks.

4. The non-transitory processor-readable storage device of claim 3, wherein the recurrent neural networks include Long Short-Term Memory (LSTM) cells.

5. The non-transitory processor-readable storage device of claim 4, wherein the first neural network and the second neural network are part of a compound chatbot.

6. The non-transitory processor-readable storage device of claim 2, wherein the first neural network and the second neural network represent modified versions of language-translation neural networks.

7. The non-transitory processor-readable storage device of claim 2, wherein the computing environment includes an enterprise computing environment, and wherein the input query question is a technical support question.

8. The non-transitory processor-readable storage device of claim 1, wherein using the first neural network further includes:

determining a developer team associated with the first answer; and informing the developer team when the input query question cannot be answered by the first neural network with the predetermined degree of confidence.

9. The non-transitory processor-readable storage device of claim 1, wherein using the first neural network further includes:
intelligently routing the input query question to an engineer that is most qualified to answer the input query question, in accordance with learning implemented via the first neural network.

10. The non-transitory processor-readable storage device of claim 8, wherein informing further includes automatically sending an electronic message to the developer team.

11. The non-transitory processor-readable storage device of claim 1, further including displaying the first answer or second answer in a first portion of User Interface (UI) display screen and results of a search engine in a second portion of the UI display screen, and wherein the search engine includes an index-based search engine.

12. A method for facilitating generating answers to questions pertaining to a computing environment, the method comprising:
training a first neural network with a first training set that is based on answers from a developer/administrator system to questions from a support staff system, wherein the first training set overtrains the first neural network to provide exact fit between the answers and the questions associated with the first training set;
training a second neural network based on a second training set that includes information from remote knowledge systems, wherein the second training set is expert-based and is broader than the first training set, wherein the second training set undertrains the second neural network;
after the training of the first neural network and the second neural network, receiving an input query question pertaining to the computing environment;
determining if the input query question can be answered with a predetermined degree of confidence by the first neural network, and providing a first signal in response thereto;
using the first neural network to generate a first answer to the input query question when the input query question can be answered with the predetermined degree of confidence, as indicated by the first signal; and
employing the second neural network to provide a second answer to the input query question when the input query question cannot be answered by the first neural network with the predetermined degree of confidence, as indicated by the first signal, wherein the second answer is a guess for answering the input query question.

13. The method of claim 12, wherein the first neural network includes an overtrained neural network, wherein the second neural network includes a non-overtrained neural network.

14. The method of claim 13, wherein the first neural network and the second neural network include recurrent neural networks.

15. The method of claim 14, wherein the recurrent neural networks include Long Short-Term Memory (LSTM) cells.

16. The method of claim 15, wherein the first neural network and the second neural network are part of a compound chatbot.

17. The method of claim 13, wherein the first neural network and the second neural network represent modified versions of language-translation neural networks.

18. The method of claim 13, wherein the computing environment includes an enterprise computing environment, and wherein the input query question is a technical support question.

19. The method of claim 12, wherein using the first neural network includes:
determining a developer team associated with the first answer; and
informing the developer team when the input query question cannot be answered by the first neural network with the predetermined degree of confidence.

20. An apparatus comprising:
one or more processors;
logic encoded in one or more non-transitory media for execution by the one or more processors and when executed operable for:
training a first neural network with a first training set that is based on answers from a developer/administrator system to questions from a support staff system, wherein the first training set overtrains the first neural network to provide exact fit between the answers and the questions associated with the first training set;
training a second neural network based on a second training set that includes information from remote knowledge systems, wherein the second training set is expert-based and is broader than the first training set, wherein the second training set undertrains the second neural network;
after the training of the first neural network and the second neural network, receiving an input query question pertaining to the computing environment;
determining if the input query question can be answered with a predetermined degree of confidence by the first neural network, and providing a first signal in response thereto;
using the first neural network to generate a first answer to the input query question when the input query question can be answered with the predetermined degree of confidence, as indicated by the first signal; and
employing the second neural network to provide a second answer to the input query question when the input query question cannot be answered by the first neural network with the predetermined degree of confidence, as indicated by the first signal, wherein the second answer is a guess for answering the input query question.

* * * * *